United States Patent [11] 3,628,430

[72] Inventor John E. Morse
 Rochester, N.Y.
[21] Appl. No. 16,393
[22] Filed Mar. 4, 1970
[45] Patented Dec. 21, 1971
[73] Assignee Eastman Kodak Company
 Rochester, N.Y.

[54] PHOTOGRAPHIC APPARATUS FOR PRODUCING A TAMPERPROOF IDENTIFICATION CARD
13 Claims, 9 Drawing Figs.
[52] U.S. Cl. .................................................. 95/1.1,
 95/12, 355/43, 355/66
[51] Int. Cl. ..................................................... G03b 27/70
[50] Field of Search ........................................... 95/1.1, 12;
 355/40, 43, 66

[56] References Cited
UNITED STATES PATENTS
3,345,924 10/1967 Kitrosser ..................... 355/43 X
3,395,629 8/1968 Salvesen ...................... 95/1.1

Primary Examiner—Samuel S. Matthews
Assistant Examiner—Richard A. Wintercorn
Attorneys—Robert W. Hampton and John D. Husser ABSTRACT: An optical apparatus for photographing images of two or more objects at different magnifications to produce a composite photograph of complementary images having a blurred transition zone without clearly discernible edges between such images. The apparatus includes at least two objectives for forming images of at least two objects on a single record medium. A portion of the light from one object is effectively blocked by a mask which is complementary to a second mask which effectively blocks a portion of the light from a second object. The complementary masks are spaced from the objectives a distance sufficient to blur the edges of the images defining the masked areas thereby producing the blurred transition zone. The apparatus is especially suited for making tamperproof identification cards.

PATENTED DEC 21 1971 3,628,430
SHEET 1 OF 2
FIG. 1E
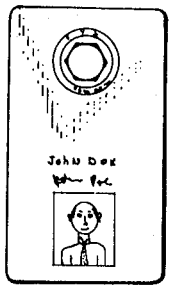
FIG. 1A
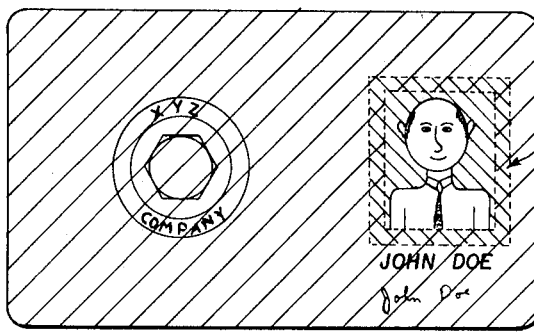
FIG. 1D
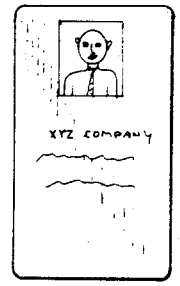
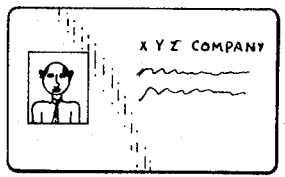
FIG. 1B
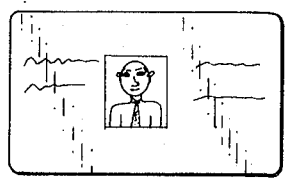
FIG. 1C
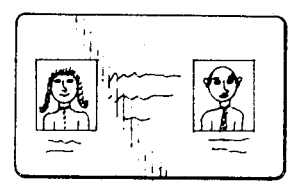
FIG. 1F
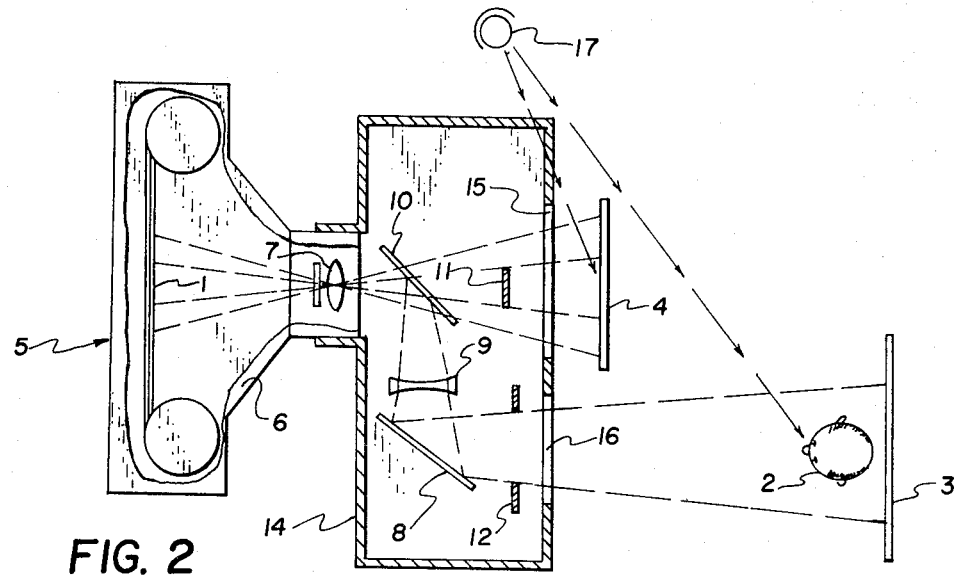
FIG. 2
JOHN E. MORSE
INVENTOR.
BY John D. Hussy
Robert W. Hampton
ATTORNEYS

JOHN E. MORSE
INVENTOR.

PHOTOGRAPHIC APPARATUS FOR PRODUCING A TAMPERPROOF IDENTIFICATION CARD

CROSS-REFERENCE TO RELATED APPLICATION

Reference is made to commonly assigned copending U.S. Pat. application Ser. No. 16,434, entitled PHOTOGRAPHIC APPARATUS AND METHOD FOR PRODUCING A TAMPERPROOF IDENTIFICATION CARD, filed in the name of John E. Morse On Mar. 4, 1970.

BACKGROUND OF THE INVENTION

The present invention relates to apparatus for combining individual images of at least two objects into a composite image on a record medium. More particularly, it relates to apparatus for producing a record of such a composite image having a blurred transition zone between such individual images without any clearly discernible border edges between such individual images.

One such apparatus is shown in commonly assigned copending U.S. Pat. application Ser. No. 16,434, entitled PHOTOGRAPHIC APPARATUS AND METHOD FOR PRODUCING A TAMPERPROOF IDENTIFICATION CARD, filed in the name of John E. Morse on March 4, 1970.

As was discussed in the referenced copending application, prior art apparatus have not effectively produced a composite photograph without sharp edges separating the individual images contained in the photograph. In the present application, an approach different from the one in the referenced copending application is presented for producing a record of a composite image which is inherently tamperproof, that is, one in which one of the individual images cannot be separated from the other individual image, and a different image substituted therefor, without such substitution being detectable by the average layman.

SUMMARY OF THE INVENTION

Accordingly, it is an object of this invention to produce a record of a composite image containing individual images at different magnifications of at least two objects with at least one blurred transition zone having no clearly discernible edge between the individual images.

It is another object of this invention to provide an improved camera structure for photographing at least two objects to produce a composite image of the object images at different magnifications on a photographic surface.

Still another object of this invention is to provide an apparatus for use with a camera to facilitate photographing at least two objects to produce a composite image of the object images at different magnifications with at least one blurred transition zone between the individual images.

In one disclosed embodiment of the invention, an optical apparatus is provided in which light from each object, the images of which are to be formed in complementary relation in a primary image plane at different magnifications, is masked by masking means, each masking means being complementary to the other. The apparatus includes an optical system for producing a first image of one of the objects in the field of the means for forming an image of the other object so that said means can form images of both objects in the primary image plane. Since the masking means are complementary, and because of their location, a blurred transition zone having no clearly discernible edges between the individual images is produced in the composite image recorded on a recording medium in the primary images plane.

The term "complementary" as used in the specification and claims of this application with reference to image forming and light masking elements refers to the cooperative structural configuration and position of such elements provide in light paths from separate objects to a predetermined exposure area in an image plane whereby substantially complete exposure of the predetermined exposure area is accomplished by the cumulative light passing to the exposure area from the separate objects past the masking elements, and whereby each of the separate objects is imaged on a separate portion of the exposure area without any substantial double exposure between object images.

For example, the term complementary is used herein, with respect to systems having two masking elements and two image-forming elements or means, to describe structural arrangements with which a defined exposure area can be exposed in first and second portions, respectively, by light transmitted from first and second objects. In such systems, one of the complementary masks prevents light from the first object from reaching the second portion of the exposure area while permitting light from the first object to be transmitted by a first image-forming means to the first portion of the exposure area, and the other of the complementary masks prevents light from the second object from reaching the first portion of the exposure area while allowing light from the second object to be transmitted by a second image-forming means to the second portion of the exposure area. Two such complementary masks coacting together with properly oriented image-forming means allow substantially complete exposure of the defined exposure area by light from both the first and second objects exposing images thereon in complementary relation while preventing double exposure in either the first or second area. If two such complementary masks are spaced from the objects and from the means for forming images of those objects, as is the case with the embodiments herein disclosed, each will produce a vignetting effect, and slight double exposure will occur in a narrow region along the common border of the first and second portions of the defined exposure area. This narrow region is the unique transition zone referred to throughout the specification and claims of this application.

Similar arrangements of more than two masks can be provided in accordance with the teachings disclosed herein and the term complementary is therefore intended to apply to analogous situations involving more than two masks, more than two image-forming means, more than two objects, and more than two portions constituting the defined exposure area.

The term "field" as used in the specification and claims of this application with reference to lens systems refers to the area within the light transmission path of a lens on either side of the lens, i.e., the object side or the image side, unless "field of view" is specified, in which case reference is to the object side of the lens only.

The term "magnification," as used in the specification and claims of this application with reference to image formation, is used in its technical sense which includes values less than one (sometimes referred to as minification or reduction) as would be produced by negative (or divergent) lenses, in which case the image is smaller than the object, as well as values greater than one, produced by positive (or convergent) lenses, where the image is larger than the object.

Other objects and advantages of the invention will become apparent from the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 1A through 1F illustrate various formats of identification cards which may be produced in accordance with the invention;

FIG. 2 is a schematic illustration of one embodiment of the invention;

DESCRIPTION OF PREFERRED EMBODIMENTS

Figure 3:
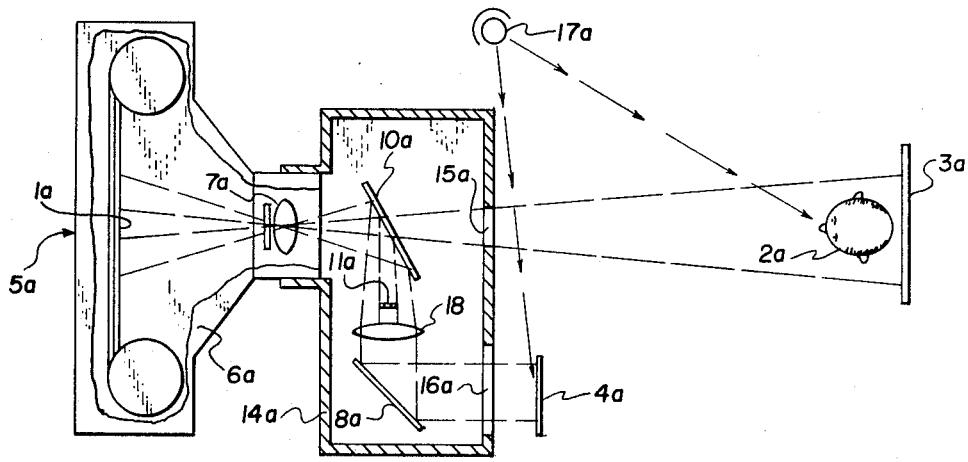
FIG. 3 is a schematic illustration similar to FIG. 2 showing a second embodiment of the invention.

Referring to FIG. 2 of the drawings there is shown an apparatus for producing and recording images at different magnifications of two objects as a composite image on a record medium 1 located in the primary image plane of the apparatus. In this instance one object comprises a person, indicated by the reference numeral 2, with a suitable background 3, and the second object comprises certain data or factual information regarding such person and contained on a card 4. The composite image formed on a record medium 1 may be used to produce an identification card of the type and format illustrated in FIG. 1A of the drawings.

As shown in FIG. 2, the record medium 1 may take the form of a photographic film which may be suitably supported in the primary image plane of a camera 5. The camera 5 may take the form of a still camera having a housing 6 and an objective 7 for forming an image on the film 1.

As is well known to those skilled in the art, a lens system such as the camera objective 7 has a predetermined field of view. One object, in this case, the data card 4, is positioned in such field, and means are provided for producing an image of the other object, in this case the person 2 and background 3, in such field so that a composite image which includes the individual images of both objects is produced on film 1 by objective 7.

As shown in FIG. 2, the means for producing an image of the person 2 and background 3 in the field of objective 7 may take the form of a reflecting mirror 8, a negative lens 9, and a beam splitter such as, for example, a partially reflecting mirror 10. Light from the person 2 and background 3 is reflected by mirror 8 through lens 9 which produces a minified virtual image of the person 2 and background 3 at the object distance of the data card 4. Such virtual image appears in the field of objective 7 since mirror 10 is positioned within the field of objective 7 so as to reflect light from lens 9 to objective 7. Light from data card 4 which passes through mirror 10 to objective 7 is partially blocked by mask 11 which is positioned between data card 4 and mirror 10, thereby defining internal edge portions of the data card image formed on film 1. Light from person 2 and background 3 is partially blocked by mask 12 which is positioned between the person 2 and mirror 8, thereby defining external edge portions of the image of the person formed on film 1. Mask 12 is complementary to mask 11 so that in the composite image produced on film 1 by objective 7 there is no double exposure of the individual images in their respective image areas and no substantial double exposure in the internal and external edge portions defined by the two masks.

Masks 11 and 12 are spaced from objective 7 and lens 9, respectively, distances sufficient to cause vignetting, or blurring, of the internal and external edge portions defined by the masks on film 1, and to preclude any mask edge definition in the composite image. Since masks 11 and 12 are complementary, they are further positioned such that the blurred internal and external edge portions of the images defined by such masks are contiguous. The coaction of the contiguous blurred edge portions, and the absence of any mask edge definition, produce on film 1 a unique transition zone 13 between the object images having no clearly discernible edges.

The film 1 may be processed by conventional photographic methods after exposure to the composite image of the two objects 2 and 4 in the manner described above. By printing the film negative (not shown) on a conventional photosensitive medium, a tamperproof identification card with a format similar to the one shown in FIG. 1A may be produced which has a blurred transition zone 13 (indicated by dotted lines) between the object images. No sharp edges will appear between the two object images thereby making it difficult to separate the images without the separation being visually detectable.

Composite images of other formats such as illustrated in FIGS. 1B and 1C may be produced on film 1 using the apparatus depicted in FIG. 2 by varying the format of masks 11 and 12 and adjusting the positions of objects 2 and 4 accordingly.

The means described above for producing an image of an object such as person 2 in the field of objective 7 may be supported in various ways. In accordance with one feature of the embodiment shown in FIG. 2, mirror 8, lens 9, partially reflecting mirror 10, and masks 11 and 12 may be supported in a housing 14 which may be detachably connected to camera housing 6 as shown. The housing 14 may be provided with suitable object viewing apertures 15 and 16. If desired, mask 12 may be eliminated by properly sizing and positioning aperture 16 so that it effectively performs the masking function performed by mask 12. Although housing 14 is shown in only one position in FIG. 2, it may be rotatably as well as detachably connected with camera housing 6 such that it may be rotated 360° about the optical axis of objective 7 in order to vary the position of the person image in relation to the data card image. Such a construction would enable the user to produce a composite image of additional formats such as, for example, those illustrated in FIGS. 1D and 1E, after repositioning the data card 4 and the person 2 and rotating the housing 14 accordingly.

If desired, an artificial means of illumination 17 may be provided. The illumination means 17 may take various forms known to those skilled in the art, such as a conventional camera flash unit.

It will be apparent to those skilled in the art that a plurality of objects and/or a plurality of image producing means may be positioned in the field of objective 7 to produce a composite image of more than two object images on record medium 1 without discernible edges between the images. FIG. 1F illustrates one example of a tamperproof identification card format with more than two images recorded.

Referring to FIG. 3, another embodiment of the invention is depicted wherein parts corresponding to parts shown in FIG. 2 have been assigned like reference numerals followed by the suffix a. In FIG. 3, the positions of person 2a and background 3a and the position of data card 4a, the images of which are to be recorded on record medium 1a, have been reversed from the positions shown in FIG. 2. The negative lens 9 of FIG. 2 is replaced by a positive lens 18 which will produce a magnified virtual image of data card 4a at the object distance of person 2a. Also, mask 11a has been relocated from its original position in FIG. 2 to a position between lens 18 and partially reflecting mirror 10a. Mask 12 of the embodiment shown in FIG. 2 has been eliminated and light from person 2a is effectively masked by aperture 15a which has been sized so that it is complementary with mask 11a. If desired, a mask may be used instead of aperture 15a to accomplish the masking function. The film negative (not shown) of the composite image produced by the embodiment depicted in FIG. 3 may be used to produce, by conventional photographic printing methods, a tamperproof identification card of a format as illustrated in FIG. 1B.

Figure 4:
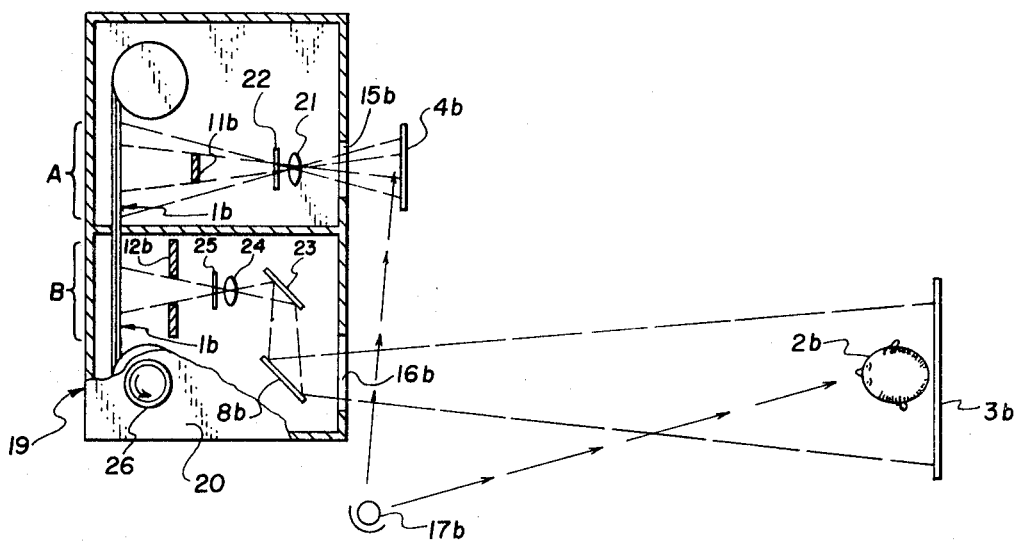
FIG. 4 is a schematic illustration of a sequential multilens camera illustrating still another embodiment of the invention.

Still another embodiment of the invention is illustrated in FIG. 4 wherein parts corresponding to parts shown in FIG. 2 have been assigned like reference numerals followed by the suffix b. A sequential multilens-system camera is depicted and indicated generally by the reference numeral 19. Camera 19 may take the form of a still camera having a housing 20 supporting an objective 21 for forming an image of data card 4b on film area 1b when it is in a first position indicated by the letter A; a shutter 22 for controlling transmission of light from objective 21 to film position A; a mask 11b for blocking a portion of the light transmitted by objective 21, thereby defining internal edge portions of the data card image formed on film area 1b; an optical means comprising a mirror 8b, a second mirror 23, and a second objective 24, for forming an image of person 2b on film area 1b at a magnification different from that of the data card image and when film area 1b is in a second position indicated by the letter B; a second shutter 25 for controlling transmission of light from objective 24 to film position B; and a mask 12b for blocking a portion of the light transmitted by objective 24, thereby defining external edge portions of the image of the person formed on film area 1b.

Upon operation of shutter 22, the data card 4b is imaged on film area 1b in its first position A by objective 21, the light transmitted thereby being partially masked by mask 11b. Film area 1b is then advanced to its second position B by a film advance means, which may be any means known to those skilled in the art, here indicated by reference numeral 26. If conventional strip film is used, advancing a particular area 1b of the film from position A to position B for a second exposure will also advance an area of unexposed film to position A. It is therefore desirable to prevent stray light from the second exposure of film area 1b in position B from reaching the unexposed film area in position A. Film positions A and B can be made lighttight with respect to each other to prevent light crossover between the two systems.

Light from person 2b is reflected by mirror 8b to mirror 23, which in turn reflects it to objective 24. Upon operation of shutter 24, objective 24 forms an image of person 2b on film area 1b in its second position B, the light transmitted by objective 24 being partially masked by mask 12b.

Masks 11b and 12b are complementary so that there is no double exposure of the individual images in their respective image areas on film 1b and no substantial double exposure in the internal and external edge portions defined by the two masks. Masks 11b and 12b are spaced from objectives 21 and 24, respectively, distances sufficient to cause vignetting, or blurring, of the internal and external edge portions defined by the two masks on film area 1b, and to preclude any mask edge definition in the composite image. Since masks 11b and 12b are complementary, they are further positioned such that the blurred internal and external edge portions of the images defined by such masks are contiguous. The coaction of the contiguous blurred edge portions, and the absence of any mask edge definition, produce on film area 1b a unique transition zone between the object images.

Tamperproof identification cards with many different formats such as, for example, those depicted in FIGS. 1A through 1E, may be produced by the embodiment shown in FIG. 4. The particular format to be produced depends on the format selected for masks 11b and 12b and the positioning of objects 2b and 4b accordingly.

The invention has been described in detail with particular reference to preferred embodiments thereof, but it will be understood that variations and modifications can be effected within the spirit and scope of the invention.

I claim:

1. Apparatus for combining images of at least first and second objects at respectively different magnifications into a composite image in a plane, said apparatus comprising:
   a. first means for forming an image of the first object in the plane at a first magnification;
   b. second means for forming an image of the second object in the plane in complementary relation with the image of the first object and at a second magnification;
   c. first masking means for masking a portion of the light from the first object and for defining in the plane an edge portion of the first object image, said first masking means positioned between the first object and the surface and spaced in relation to said first image-forming means so as to blur said first image edge portion; and
   d. second masking means for masking a portion of the light from the second object and for defining in the plane an edge portion of the second object image, said second masking means positioned between the second object and the surface and spaced in relation to said second image-forming means so as to blur said second image edge portion;
   e. said first and second masking means being complementary and positioned such that said blurred edge portions of the first and second object images are contiguous and coactively produce a blurred transition zone without clearly discernible edges between the images of the first and second objects in the composite image produced in the plane.

2. Apparatus for forming a composite image of at least first and second objects at different magnifications, said apparatus comprising:
   a. a first objective for forming an image of the first object in a primary image plane at a first magnification;
   b. means, including a second objective, for forming an image of the second object in the primary image plane in complementary relation with the first object image and at a second magnification;
   c. first masking means for masking a portion of the light from the first object and for defining in the primary image plane an edge portion of the first object image, said first masking means positioned in the field of said first objective and spaced therefrom a distance sufficient to blur said edge portion of the first object image; and
   d. second masking means for masking a portion of the light from the second object and for defining in the primary image plane an edge portion of the second object image, said second masking means positioned in the field of said second objective and spaced therefrom a distance sufficient to blur said edge portion of the second object image;
   e. said first and second masking means being complementary and positioned such that said blurred edge portions of the first and second object images are contiguous and coactively produce a blurred transition zone without clearly discernible edges between the first and second object images in the composite image.

3. Photographic apparatus for forming a composite image of at least first and second objects at different magnifications, said apparatus comprising:
   a. a first objective for forming an image of the first object in a primary image plane at a first magnification:
   b. means, including said first objective, a second objective, and a reflecting means, for forming an image of the second object in the primary image plane in complementary relation with the first object image and at a second magnification, said reflecting means being positioned so as to reflect light from said second objective to said first objective;
   c. first masking means for masking a portion of the light from the first object and for defining in the primary image plane an edge portion of the first object image, said first masking means positioned in the field of said first objective and spaced therefrom a distance sufficient to blur said edge portion of the first object image; and
   d. second masking means for masking a portion of the light from the second object and for defining in the primary image plane an edge portion of the second object image, said second masking means positioned in the field of said second objective and spaced therefrom a distance sufficient to blur said edge portion of the second object image;
   e. said first and second masking means being complementary and positioned such that said blurred edge portions of the first and second object images are contiguous and coactively produce a blurred transition zone without clearly discernible edges between the first and second object images in the composite image.

4. Photographic apparatus as defined in claim 3 wherein said reflecting means includes a partially reflecting mirror positioned in the field of said first objective.

5. Photographic apparatus for producing a composite image of at least first and second objects on a light sensitive surface at different magnifications, said apparatus comprising:
   a. a casing adapted to contain the light sensitive surface and having a first objective for forming an image of the first object on the surface at a first magnification;
   b. a housing detachably connected to said casing and including means defining a first aperture through which light from the first object is transmitted to said first objective;

c. means, supported by said housing and including a second objective which forms an image of the second object at the object distance of the first object, for producing an image of the second object in the field of said first objective at a second magnification, said second objective being constructed and located with respect to said first objective so that said first objective produces a composite image of both objects on the surface;

d. first masking means for masking a portion of the light from the first object and for defining on the surface an edge portion of the first object image, said first masking means positioned in the field of said first objective and spaced therefrom a distance sufficient to blur said edge portion of the first object image; and e. second masking means for masking a portion of the light from the second object and for defining on the surface an edge portion of the second object image, said second masking means positioned in the field of said second objective and spaced a distance therefrom sufficient to blur said edge portion of the second object image;

f. said first and second masking means being complementary and positioned such that said blurred edge portions of the first and second object images are contiguous and coactively produce a blurred transition zone without clearly discernible edges between the first and second object images in the composite image formed by said first objective.

6. Photographic apparatus as defined in claim 5 wherein said means for producing an image of the second object in the field of said first objective further includes:

a. a partially reflecting first mirror positioned in the field of said first objective for directing light transmitted by said second objective to said first objective; and b. a second mirror for directing light from the second object to said objective.

7. Photographic apparatus as defined in claim 5 wherein said casing comprises a camera casing adapted for receiving a photographic medium.

8. Apparatus for attachment to a camera to facilitate photographing a composite image of at least two objects at different magnifications, the apparatus being for use with a camera of the type having a primary image plane and an objective for forming an image in the primary image plane at a first magnification, said apparatus comprising:

a. a support;

b. means for detachably connecting said support to the camera in operative relation with the camera objective;

c. first masking means, located on said support so as to be in the field of the camera objective when said support in connected to the camera, for masking a portion of the light from a first object in the field of the camera objective and for defining an edge portion of the image of the first object formed in the primary image plane by the camera objective, said first masking means spaced from the camera objective a distance sufficient to blur said edge portion of the first object image;

d. means, located on said support and including a second objective which forms an image of the second object at the object distance of the first object, for cooperating with the camera objective to form an image of a second object in the primary image plane in complementary relation with the image of the first object and at a second magnification;

e. second masking means, located on said support in the field of said second objective, for masking a portion of the light from the second object and for defining in the primary image plane an edge portion of the second object image, said second masking means spaced a distance from said second objective sufficient to blur said edge portion of the second object image;

f. said first and second masking means being complementary and positioned such that said blurred edge portions of the first and second object images are contiguous and coactively produce a blurred transition zone without clearly discernible edges between the first and second object images in the composite image.

9. Apparatus as defined in claim 8 wherein said support includes a housing comprising:

a. first means for defining a first aperture through which light from the first object is transmitted to the camera objective; and b. second means for defining a second aperture through which light from the second object is transmitted to said cooperating means.

10. Apparatus as defined in claim 9 wherein said cooperating means includes:

a. a partially reflecting first mirror positioned in the field of the camera objective for directing light transmitted by said second objective to the camera objective; and b. a second mirror for directing light from the second object to said second objective.

11. Apparatus as defined in claim 1 wherein said apparatus further comprises means for moving a light sensitive medium in the plane between a first position for receiving light from the first object transmitted by said first image-forming means, and a second position for receiving light from the second object transmitted by said second image-forming means.

12. In a camera for producing a composite image of at least first and second objects at respectively different magnifications on a photographic medium, the combination comprising:

a. first optical means, including a first objective, for forming an image of the first object on the photographic medium at a first magnification;

b. second optical means, including a second objective, for forming an image of the second object on the photographic medium in complementary relation with the first object image and at a second magnification;

c. first masking means for masking a portion of the light from the first object and for defining on the photographic medium an edge portion of the first object image, said first masking means positioned in the field of said first objective and spaced therefrom a distance sufficient to blur said edge portion of the first object image;

d. second masking means for masking a portion of the light from the second object and for defining on the photographic medium an edge portion of the second object image, said second masking means positioned in the field of said second objective and spaced therefrom a distance sufficient to blur said edge portion of the second object image;

e. said first and second masking means being complementary and positioned such that said blurred edge portions of the first and second object images are contiguous and coactively produce a blurred transition zone without clearly discernible edges between the first and second object images in the composite image; and f. means for moving the photographic medium between a first position for receiving light from the first object transmitted by said first optical means, and a second position for receiving light from the second object transmitted by said second optical means.

13. In a camera as defined in claim 12 wherein said second optical means further comprises first and second mirrors, said first mirror positioned so as to direct light from the second object to said second mirror, and said second mirror positioned so as to direct light from said first mirror to said second objective so that said second objective can form an image of the second object on the photographic medium in the second position.

* * * * *